United States Patent [19]

Ferretti

[11] Patent Number: 4,524,016
[45] Date of Patent: Jun. 18, 1985

[54] PROCESS FOR SPHEROIDAL BAFCL:EU PHOSPHOR PARTICLES

[75] Inventor: August Ferretti, Wilmington, Del.

[73] Assignee: E. I. Du Pont de Nemours and Company, Wilmington, Del.

[21] Appl. No.: 509,324

[22] Filed: Jun. 28, 1983

[51] Int. Cl.$^3$ ............................................ C09K 11/465
[52] U.S. Cl. ................................................ 252/301.4 H
[58] Field of Search .................... 252/301.4 H; 502/9

[56] References Cited

U.S. PATENT DOCUMENTS

| | | | |
|---|---|---|---|
| 1,561,971 | 11/1925 | Coffin et al. | 502/9 X |
| 2,467,470 | 4/1949 | Gerhold et al. | 502/9 X |
| 2,819,229 | 1/1958 | Strecker et al. | 502/9 |
| 4,029,851 | 6/1977 | Degenhardt | 252/301.4 H X |
| 4,080,306 | 3/1978 | Ferretti | 252/301.4 H |

Primary Examiner—Jack Cooper

[57] ABSTRACT

Process for preparing spheroidal particulate BaFCl:Eu phosphor having a narrow size distribution, which process comprises:

(a) spray drying the slurry comprised of BaFCl, or the precursors thereof, a europium halide, and a $BaCl_2$ flux in a liquid under conditions which produce porous spheroidal agglomerates of BaFCl, or the precursors thereof, $BaCl_2$, and the europium halide, the agglomerates having an average diameter larger than the desired diameter of the particulate phosphor;

(b) firing the porous spheroidal agglomerates of step (a) in a flowing inert atmosphere for about 10 to about 120 minutes at a temperature of about 650° C. to about 950° C.;

(c) cooling the fired material of step (b) to ambient temperature in an inert atmosphere;

(d) washing the cooled material of step (c) with water to remove $BaCl_2$; and (e) drying the washed material of step (d) to remove the water and to produce the free flowing powder comprised of spheroidal particulate BaFCl:Eu phosphor.

7 Claims, 4 Drawing Figures

F I G. 1
10 μ

F I G. 2
⊢―――⊣
10 μ

F I G. 3
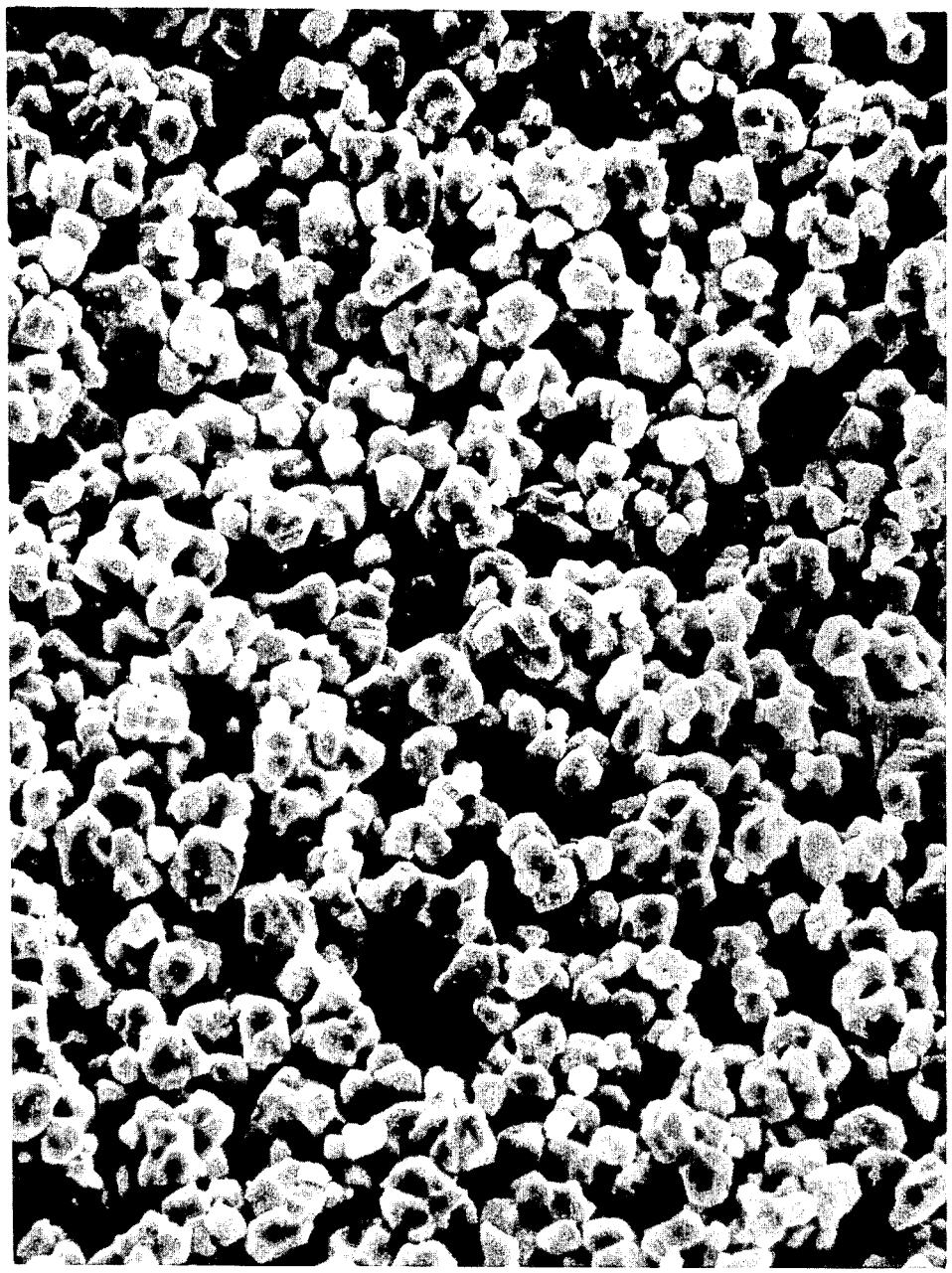
10 μ

F I G. 4
|—————|
10 μ

PROCESS FOR SPHEROIDAL BAFCL:EU PHOSPHOR PARTICLES

FIELD AND BACKGROUND

1. Field of the Invention

This invention relates to BaFCl:Eu phosphors and to their preparation.

2. Background

The use of europium-doped barium fluorochloride (BaFCl:Eu) as a luminescent material in x-ray intensifying screens is well-known. The emission of light occurs in the violet and ultraviolet region of the spectrum, which is especially convenient for use with x-ray films, and it occurs with substantially greater efficiency than is obtained with calcium tungstate, which has been widely employed in x-ray screens. BaFCl:Eu also exhibits excellent stopping power for x-rays.

Various processes are known in the art for preparing BaFCl:Eu phosphor which is useful in x-ray intensifying screens, for example, U.S. Pat. No. 3,988,252 and U.S. Pat. No. 4,080,306. The processes of the art provide BaFCl:Eu particles that are flat and plate-like. FIG. 1 shows the scanning electron micrograph (S.E.M.) of milled particles of U.S. Pat. No. 3,988,252. Although the process of U.S. Pat. No. 4,080,306 provides particles with rounded edges and surfaces, the particles retain the flat plate-like habit, as shown by the S.E.M. in FIG. 2.

Plate-like particles can cause difficulties in x-ray intensifying screen fabrication. Although from the standpoint of screen-performance, it is desirable to maximize the phosphor content in the screen, generally, phosphor particles having a plate-like habit require a higher binder to phosphor ratio than those that are more spheroidal. Furthermore, screens made with plate-like phosphor particles are more prone to bubble or blister when the protective layers are applied, and this results in an unacceptable screen. The plate-like phosphor particles can be milled and classified to obtain particles that are less plate-like and that are within the proper size range. However, such milling damages the surfaces of the crystallites, introduces impurities due to wear of grinding medium, and generates subsize fine particles which represent material loss, and the product consists of particles with a wide range of sizes and shapes.

It is an object of this invention to provide BaFCl:Eu phosphor particles which are spheroidal in shape. Another object is to provide such spheroidal particles having a narrow size distribution. Still another object is to provide a process for preparing such spheroidal particles. Other objects will become apparent hereinafter.

BRIEF DESCRIPTION OF THE DRAWINGS

FIGS. 1 and 2 are scanning electron micrographs which show the geometry of the BaFCl:Eu particles prepared by processes disclosed in U.S. Pat. No. 3,988,252 (FIG. 1) and U.S. Pat. No. 4,080,306 (FIG. 2). FIGS. 3 and 4, at two different magnifications, are scanning electron micrographs which show the spheroidal particulate BaFCl:Eu of this invention.

DETAILED DESCRIPTION OF THE INVENTION

The invention herein resides in spheroidal particulate europium-doped barium fluorochloride (BaFCl:Eu) phosphor having a narrow size distribution, and in a process for making such spheroidal particulate phosphor. More specifically, the process comprises (a) spray drying the slurry comprised of BaFCl, or the precursors thereof, a europium halide, and a $BaCl_2$ flux in a liquid under conditions which produce porous spheroidal agglomerates of BaFCl, or the precursors thereof, $BaCl_2$, and the europium halide, the agglomerates having an average diameter larger than the desired diameter of the phosphor particles; (b) firing the porous spheroidal agglomerates of step (a) in a flowing inert atmosphere of, for example, nitrogen or argon, for from about 10 to about 120 minutes at a temperature of from about 650° C. to about 950° C.; (c) cooling the fired material to ambient (room) temperature in the inert atmosphere; (d) washing the material obtained in step (c) with water to remove $BaCl_2$; and (e) drying the washed material of step (d) to obtain free flowing, spheroidal, particulate, europium-doped barium fluorochloride.

As indicated, the first step of the process consists of forming and spray drying a slurry comprised of BaFCl, or the precursors thereof, such as $BaCl_2$ and $BaF_2$, a europium halide, such as $EuF_2$, $EuCl_3$, or $EuF_3$, or a mixture thereof, and a $BaCl_2$ flux in a liquid. When BaFCl is used, the amount of $BaCl_2$ flux is preferably at least 3 wt percent, based on the weight of the BaFCl present. When the precursors $BaF_2$ and $BaCl_2$ are used, the amount of $BaCl_2$ is preferably at least 5 wt %, and more preferably at least 10 wt %, in excess of the stoichiometric amount needed to form BaFCl with the $BaF_2$ present. Organic liquids or water can be used as the liquid. For example, a slurry of $BaCl_2$, $BaF_2$ and a europium halide, such as $EuF_3$ or $EuF_2$, or a mixture thereof, can be formed in a nonaqueous liquid, such as Freon ® TMS Solvent, a blend of trichlorotrifluoroethane and methanol with a stabilizer. When organic liquids are used, it is necessary to treat the spray dried agglomerates to insure complete removal of the organic material before the final firing in inert atmosphere. Therefore, these samples are fired in air at about 250° C. to 375° C. for about 0.5–1.5 hours before firing in the inert atmosphere.

Preferably, the slurry in step (a) is comprised of preformed BaFCl, europium halide, either $EuF_2$ or $EuCl_3$, or both, and a $BaCl_2$ flux in an aqueous solution. The preformed BaFCl can be made using one of the various processes known in the art. An especially preferred method of forming the slurry is to precipitate BaFCl in a vigorously stirred aqueous $BaCl_2$ solution containing the europium halide. This is accomplished by a digestion-precipitation process involving $BaF_2$ and an aqueous $BaCl_2$ solution. $BaF_2$ powder is slowly added to an aqueous $BaCl_2$ solution which contains the europium halide. The amount of $BaCl_2$ present must be in excess of the stoichiometric amount needed to form BaFCl as indicated above. In order to insure the complete reaction of the $BaF_2$ in the formation of BaFCl, it is especially preferred to use an amount of $BaCl_2$ such that the aqueous solution is at all times at least 30% saturated with $BaCl_2$. The $BaF_2$ powder is added over a period of about 5–15 minutes and vigorous stirring is maintained for about 4–18 hours, depending on the sample size. The time is not critical but such times are typical of the times required to effect the substantially complete reaction of $BaF_2$ and $BaCl_2$ to form BaFCl. When the BaFCl precipitation period is completed, a small portion of the slurry can be removed and dried and subjected to x-ray analysis to confirm the substantially complete reaction of $BaF_2$, i.e., that there is no evidence of $BaF_2$ x-ray diffraction lines. If the water-soluble $EuCl_3$ is used, it is preferrable to add it to the aqueous $BaCl_2$ solution after the precipitation of BaFCl. Uniformity of distribution of the europium with the BaFCl matrix is critical to the performance of the phosphor. Although the use of $EuCl_3$ permits easy distribution of europium, $EuCl_3$ is susceptible to oxidation to $Eu_2O_3$ and, therefore, it is more sensitive to the drying procedure then is desirable for a commercial production process. For this reason, $EuF_2$, which is substantially water-insoluble and stable in water containing BaFCl and $BaCl_2$, is the preferred europium halide. Although slow addition of dry, finely-ground, $EuF_2$ powder to BaFCl precursor mixtures yields satisfactory results, it is simpler to form a suspension of finely ground $EuF_2$ in water, and to add this suspension to the $BaCl_2$ solution before adding the $BaF_2$, and this method is preferred.

The amount of europium halide used depends on the amount of Eu-doping desired in the phosphor. Generally, the art discloses that $Ba_{1-y}Eu_yFCl$, wherein y is from about 0.001 to about 0.2, is preferred for use as a phosphor in x-ray intensifying screens. Any such amounts disclosed in the art are herein.

The art also discloses that the introduction of other materials, e.g., Ca or Sr or a rare earth other than Eu, into the europium-doped barium fluorochloride may be advantageous, and U.S. Pat. No. 4,076,897 discloses that the addition of potassium halide reduces lag. All of these variously substituted europium-doped barium fluorochlorides are considered to be the europium-doped barium fluorochlorides that can be made by the process of this invention. The potassium, strontium, calcium or rare earth chloride can be added to the $BaCl_2$ slurry in such amount as to give the desired level of the substituent in the phosphor.

The slurry comprised of BaFCl, or appropriate precursors thereof, europium halide in a $BaCl_2$-containing liquid, and any optional ingredients is spray dried using conditions which produce spray dried particles with diameters larger than the desired diameter of the BaFCl:Eu phosphor particles. The porous spheroidal agglomerates which are produced consist of BaFCl or its precursors, $BaCl_2$ and europium halide. The specific operating conditions to produce spray dried agglomerates of a certain size will depend on the particular spray drying apparatus, but they are well-known to those familiar with spray drying.

The excess $BaCl_2$ is important for two reasons. When 1:1 ratios of $BaCl_2$:$BaF_2$ are used, the BaFCl product may contain $BaF_2$. Excess $BaF_2$ in the starting formulation is detrimental to final phosphor properties in that the phosphor exhibits lower prompt emission and higher delayed emission (lag). The effects of excess $BaF_2$ are evident no matter what process is employed to make the BaFCl:Eu. The use of excess $BaCl_2$ in starting formulations has generally proven to be beneficial, resulting in a superior phosphor with higher prompt emission. Therefore, in order to drive the precipitation-digestion reaction toward complete utilization of the $BaF_2$, excess $BaCl_2$ is used.

Excess $BaCl_2$ is also necessary to serve as a flux. The particular flux and the quantity of flux is critical. For example, it is believed that the spray drying, while effecting water removal, causes the BaFCl, or its precursors, and europium halide to be coated and cemented together with solid $BaCl_2$ to form porous spheroidal agglomerates. In addition, during the firing, the $BaCl_2$ flux enhances the sintering of the particles in the agglomerate, the forming of the BaFCl, if precursors are used, and the diffusion of the europium, and any other ingredients, into the BaFCl lattice. Finally, the flux must be immiscible with the BaFCl:Eu at room temperature and it must be rejected to the surface of the BaFCl:Eu phosphor particle where it can be removed by dissolution without affecting the BaFCl:Eu. $BaCl_2$ is the flux material which best satisfies all of the above requirements.

The porous spheroidal agglomerates obtained by spray drying must be fired at such a temperature and for such a time as to produce the desired particulate product. The size of the phosphor particles is determined by the agglomerate size and the firing conditions. If the temperature is too low or the firing time too short, consolidation of the original particles in the agglomerate does not occur and europium diffusion is insufficient. Excessive temperatures or firing times cause excessive grain growth of large BaFCl platelets. The firing temperature should be in the range of about 650° C. to about 950° C. and the firing time should be in the range of about 10 to about 120 minutes to obtain the desired product. Preferably, the firing temperature is from about 700° C. to about 850° C. and the firing time is from about 10 to 50 minutes. The firing must be carried out and the fired material must be cooled in a flowing atmosphere comprised of an inert gas, such as nitrogen or argon. Although any type of furnace which is capable of producing the desired heating conditions with the required atmosphere can be used to carry out the firing, a nitrogen-fired belt furnace is the preferred furnace. The use of a belt furnace permits the firing of a large number of samples in a continuous manner. Sample containers made of nonreactive materials, such as fused silica, are used.

The fired material is washed with water to remove $BaCl_2$ and any other water-soluble material which is present. This can be accomplished by soaking or stirring the sintered material in amounts of water which are in excess of that necessary to dissolve the water-soluble material which is present. The $BaCl_2$ can be recycled and used in subsequent slurries. After the removal of the flux by dissolution, the remaining insoluble material is dried and the free-flowing powder product consisting of spheroidal particles of europium-doped barium fluorochloride is obtained. The particles have a narrow size distribution.

In the examples that follow the $EuF_2$ suspension used was prepared in the following manner.

40.0 g of $EuF_2$ was milled in 1000 mL of distilled water for about 16 h, then washed out of the mill, and the final volume of the suspension was adjusted to 1100 mL. Assuming a uniform suspension, the $EuF_2$ concentration was 0.03636 g/mL. A sample of this suspension was evaporated to dryness at 110° C. in air and analyzed by x-ray to confirm that no decomposition had occurred during the milling operation. Prior to each use, the suspension was agitated. For each use a measured amount was removed from the bulk and slowly added to the mixture of $BaF_2$ powder and aqueous $BaCl_2$ solution at the beginning of the stirring process so as to facilitate the intimate mixing of the $EuF_2$ and the slowly-forming BaFCl precipitate.

All samples prepared in the examples were fired in fused silica boats in a B.T.U. Inc. belt furnace, Model #TLH-22-32-4N12Y, having three heating zones with an effective heating length of 24 inches (60 cm). The nitrogen flow through the furnace during the firing was maintained at 20 L/min.

To minimize possible contamination with $SiO_2$, all of the apparatus used to prepare and mix the BaFCl slurries was made of Teflon ® or was Teflon ® coated.

In the examples, all temperatures are in degrees Celsius.

EXAMPLE 1

500 g of $BaCl_2.2H_2O$ was dissolved at room temperature in 1500 mL of distilled water in a 3000 mL Teflon ® container. This solution was stirred rapidly with a Teflon ®-coated stirrer attached to an overhead motor while 100 mL of the liquid suspension containing $EuF_2$, prepared as disclosed above, was added; thus, 3.636 g of $EuF_2$ was added. Following this addition, 170 g of $BaF_2$ powder was slowly added over a period of about 5 min and stirring was continued for 16 h. The resulting suspension of $BaFCl-EuF_2$ was then spray dried using a Buchi #140 Mini Spray Dryer operated with $N_2$ as the atomizing gas. The inlet temperature was 165°, outlet temperature was 80°, pump setting was 3-4 out of 10 max., and the aspiration setting was 4. The products collected in the spray chamber and the cyclone chamber were retained as separate samples and both were placed in an oven at 120°-130° for 16 h. The individual samples were loaded into fused silica boats (the capacity of each was 150 cc) and fired in flowing $N_2$, 20 L/min, in the 3-zone belt furnace with both end zones set for 760° and the center zone set at 750°. The belt speed was 0.5 inch (1.27 cm)/min. The resulting lightly sintered compact was placed in distilled water and stirred via ultrasonic aggitation for 15-20 min. The compact fell apart and the resulting slurry was transferred to a sintered glass filtering funnel and washed to remove the $BaCl_2$ flux. The resulting powder was dried at 120°-130° overnight in air yielding a free flowing white powder. SEM (scanning electron microscopy) analysis on the spray chamber product showed a rounded morphology with an average particle size of 4-7 m. The sample from the cyclone chamber yielded rounded particles in the 3-5 m average size range. Test x-ray screens were prepared and the speed test results indicated no significant difference between the two samples; both were at the speed usually obtained with this phosphor. However, the resulting images produced by these screens were significantly sharper than those produced by commercial BaFCl:Eu screens employing phosphor prepared by the techniques of the art.

EXAMPLE 2

In order to demonstrate scale-up of this process, a large sample was prepared for use in an industrial size spray dry unit. However, because of limited size laboratory equipment which was available, the feed material was made in small lots and then combined.

500 g of $BaCl_2.2H_2O$ was dissolved with stirring in 1500 mL of distilled water. 100 mL of $EuF_2$ suspension (containing 3.63 g of $EuF_2$) was slowly added to the $BaCl_2$ solution while continuing to stir rapidly. Following the $EuF_2$ addition, 170 g of $BaF_2$ was slowly added. The resulting slurry was stirred for 8 h before the entire product was transferred to a large plastic jug. This preparation was repeated 5 times and all products were combined. The equipment used for this scaleup experiment was a Niro Atomizer Utility Spray Dryer with 4.0 foot (1.22 m) diameter, 2.5 foot (0.76 m) cylindrical height and 60° conical bottom. A model #FU-11 rotary atomizer equiped with a 120 mm high vane wheel was used with this apparatus. The spray drying conditions were:

Inlet air temp. 250°
Outlet air temp. 75°-100°
Drying Air Rate 310 Kg/h.

The particle size of the unfired cyclone products (agglomerates) was measured using a Leeds and Northrup Microtrac particle size analyzer; the results are shown in Table I.

TABLE I

90% less than 31 $\mu$m
50% less than 14.9 $\mu$m
10% less than 6.5 $\mu$m.

This sample was divided into five fractions and each fraction was fired at a different temperature to test the effect of heat treatment on the product. After washing the fired product to remove the flux and then drying the product, SEM analysis confirmed that it is possible to vary the particle size by changing the firing conditions. See Table II below.

TABLE II

| Furnace Temperature Settings Zone #1/Zone #2/Zone #3 | Average Particle Size ($\mu$m) |
| --- | --- |
| 710/700/710 | 2-3 |
| 760/750/760 | 3-4 |
| 780/770/780 | 5-8 |
| 800/800/800 | 7-11 |
| 830/820/830 | 9-14 |

Test screens were made and subjected to speed analysis; results did not show any significant difference in the phosphor light output as a consequence of particle size.

EXAMPLE 3

The formulation of the starting material was the same as disclosed in Example 2, except that a Bowen Engineering Company spray dryer was used. A two fluid nozzle, type #59-BS, feed was operated with the following settings:

| Slurry feed rate | 100 mL/min |
| --- | --- |
| Inlet Temperature | 300° |
| Outlet Temperature | 160° |
| Atomizer Air Press | 20 psig (138 kPa) |
| Cyclone $\Delta$P in $H_2O$ | 4 |

The amount of solids collected indicated a 77% yield, with the remainder retained on the walls of the unit. SEM analyses of the agglomerates showed the chamber material to have an average diameter of 15-20 $\mu$m and the cyclone product to have an average diameter of 10-15 $\mu$m. The samples from both the spray and cyclone chamber were then fired at 800° with 0.5 inch (1.27 cm)/min. belt speed under flowing $N_2$, washed with water and dried. The chamber product now averaged 7 to 11 $\mu$m in diameter and the cyclone chamber product averaged 4-7 $\mu$m in diameter.

EXAMPLE 4

500 g of $BaCl_2.2H_2O$ was dissolved in 1390 mL of distilled water at room temperature. 169 g of $BaF_2$ was slowly added and the slurry was stirred overnight at room temperature. The theoretical yield of BaFCl was calculated based on the $BaF_2$ content, and 4.95 g of $EuCl_3$ was required to achieve the desired doping level in the phosphor. To produce the $EuCl_3$, 3.37 g of $Eu_2O_3$ was dissolved in the minimum amount of HCl required to retain the resulting chloride in solution. This $EuCl_3$ solution was then added to the aqueous BaFCl/$BaCl_2$ slurry and the slurry was spray dried using the Buchi #190 unit. SEM analysis was carried out on the products of the spray chamber and the cyclone chamber before firing. The unfired spray chamber material consisted of spheroidal agglomerates approximately 13 $\mu$m in diameter, and the unfired cyclone chamber product consisted of agglomerates about 8 $\mu$m in diameter. Both spheroidal samples were fired in fused silica boats in the belt furnace using the same conditions as in Example 1. The resulting products were washed, dried and made into test screens. The speed data did not indicate any significant difference between the two samples or with those made using $EuF_2$ as the europium source (Examples 1-3). Scanning electron micrographs of the particulate product, at two different magnifications, are shown in FIGS. 3 and 4.

EXAMPLE 5

A mixture of 5.154 g of $EuF_3$ and 0.050 g of KCl was ground using a small mortar and pestle, and the ground mixture was combined with 282.72 g of $BaCl_2$ and 212.08 g of $BaF_2$, placed in a glass jar, and roll mixed at 100 rpm for 6 h. The mixture was then transferred to a high energy vibrating type grinding mill containing 800 mL of Du Pont Freon ® TMS Solvent, a commercially available constant boiling blend of Freon ® TF ($CCl_2FCClF_2$) and methanol with a stabilizer, and ground for an additional 24 h. The resulting slurry was spray dried using a Buchi #140 Mini Spray Dryer. A fraction of this spray dried material was fired at 750° in $N_2$ in the same belt furnace used in Example 1 with a belt speed of 0.5 inch (1.27 cm)/min. The resulting material was medium gray in color and, therefore, not acceptable. Another fraction of the spray dried material was subjected to additional drying in a vacuum oven at 120° for 3 h and then fired in $N_2$ at 750° as above. This material was also gray in color and unacceptable. In the belief that trace amounts of entrapped organic material may have been responsible for formation of the gray coloration, a third fraction of the spray dried material was first prefired in air at 375° for 1 h before firing in $N_2$ at 770° in the belt furnace. The resulting hard, sintered, snow-white product was washed with $H_2O$ to remove the excess $BaCl_2$, then dried and analyzed by SEM and tested in an x-ray intensifying screen. The x-ray intensifying screen test showed a speed in the normal BaFCl:Eu speed range and the SEM analysis show this example to consist of rounded particles in the 5–10 $\mu$m average size range.

Although the preferred embodiments of the invention have been illustrated and described above, it is to be understood that there is no intent to limit the invention to the precise constructions herein disclosed, and it is to be further understood that the right is reserved to all changes and modifications coming within the scope of the invention as defined in the appended claims.

I claim:

1. Process for preparing spheroidal particulate BaFCl:Eu phosphor having a narrow size distribution, which process comprises:
    (a) spray drying the slurry comprised of BaFCl, or the precursors thereof, a europium halide, and a $BaCl_2$ flux in a liquid under conditions which produce porous spheroidal agglomerates of BaFCl, or the precursors thereof, $BaCl_2$, and the europium halide, the agglomerates having an average diameter larger than the desired diameter of the particulate phosphor;
    (b) firing the porous spheroidal agglomerates of step (a) in a flowing inert atmosphere for about 10 to about 120 minutes at a temperature of about 650° C. to about 950° C.;
    (c) cooling the fired material of step (b) to ambient temperature in an inert atmosphere;
    (d) washing the cooled material of step (c) with water to remove $BaCl_2$; and
    (e) drying the washed material of step (d) to remove the water and to produce the free flowing powder consisting essentially of spheroidal particulate BaFCl:Eu phosphor.

2. Process of claim 1 wherein the agglomerates are fired at about 700° C. to about 850° C. for about 10 to about 50 minutes.

3. Process of claim 1 wherein the europium halide is $EuF_2$ and the liquid in step (a) is water.

4. Process of claim 1 wherein the europium halide is $EuCl_3$ and the liquid in step (a) is water.

5. Process of claim 1 wherein the BaFCl in step (a) is preformed.

6. Process of claim 1 wherein the inert atmosphere of steps (b) and (c) is provided by nitrogen.

7. Spheroidal particulate BaFCl:Eu phosphor having a narrow size distribution and produced by the process of claim 1.

* * * * *